Oct. 1, 1946.   O. S. PETTY   2,408,478
SEISMIC APPARATUS AND METHOD
Original Filed March 14, 1940   3 Sheets-Sheet 1

Inventor
Olive S. Petty
By Watson, Cole, Grindle & Watson
Attorney

Oct. 1, 1946.　　　　　O. S. PETTY　　　　2,408,478
SEISMIC APPARATUS AND METHOD
Original Filed March 14, 1940　　3 Sheets-Sheet 2

Inventor
Olive S. Petty
By Watson, Cole, Grindle & Watson
Attorney

Oct. 1, 1946.  O. S. PETTY  2,408,478
SEISMIC APPARATUS AND METHOD
Original Filed March 14, 1940    3 Sheets-Sheet 3

Inventor
O. S. Petty
By Watson, Cole, Grindle & Watson Attorneys

Patented Oct. 1, 1946

2,408,478

UNITED STATES PATENT OFFICE 2,408,478

SEISMIC APPARATUS AND METHOD

Olive Scott Petty, San Antonio, Tex.

Continuation of application Serial No. 324,013, March 14, 1940. This application November 17, 1943, Serial No. 510,685

19 Claims. (Cl. 177—352)

This invention relates to portable seismometers, intended particularly for use in conducting geophysical studies of the type wherein an artificial shock is imparted to the earth and the seismic waves emanating therefrom are received, after refraction through certain strata or reflection from various strata interfaces, at one or more seismometer stations which are customarily connected for electrical communication with a recording station equipped with apparatus for producing on a chart one or a plurality of traces, each one representative of changes in the frequency and amplitude of the seismic wave vibrations received by its particular seismometer.

More particularly, the invention relates to a portable seismometer of the condenser or capacitive type wherein seismic vibrations cause changes in the relative spacing of a pair of condenser plates so arranged with other impedance elements in an oscillating circuit that the frequency of oscillation is dependent upon and changes with the spacing of these plates. This circuit should have such characteristics that changes in frequency are substantially directly reflected in changes in the plate current of the thermionic tube forming a portion of the oscillating circuit. These changes in plate current are transmitted to the recording station where they serve to actuate appropriate known mechanism for forming the trace.

A number of problems present themselves and each must be solved satisfactorily for the production of a seismometer capable of operation in field service in various parts of the country where temperatures have large ranges and change rapidly; where the characters of the upper and substrata are entirely different; and where various other factors of great variability are encountered.

The apparatus must be sufficiently rugged to withstand rough treatment in handling and transportation; it must be watertight to permit of use in swamps and beneath the surfaces of bodies of water; it must be extremely compact and of comparatively light weight to permit portability. The device must be substantially self-contained; it must be capable of rapid, accurate and permanent adjustment of the several elements, and some of these adjustments must be made without opening the casing while others should be capable of change from remote points, such, for instance, as the recording station.

In order to solve the above problems, it is therefore among the objects and features of the present invention to provide a portable seismometer of the condenser type in which:

The whole of the apparatus is enclosed in a watertight housing through which the necessary conductors are passed;

The two condenser plates which are spaced closely to each other are mounted respectively for movement with the housing and with a steady mass hinged thereto;

A novel means of applying and adjusting the balancing or restoring force is provided for setting the plates at a predetermined repose spacing;

Adjustments are provided for the natural period of the seismometer, the rate of damping, the spacing of the plates and for other characteristics;

The repose setting can be adjusted electrically from a remote position to permit adjustment of the sensitivity and frequency responsiveness of the seismometer;

Novel means is employed for mounting the vacuum tube and other circuit components whereby they are given the greatest possible protection against damage or change in characteristics;

Novel means are used for supporting the framework of the mechanism within the housing and conducting the currents to and from the various electrical portions of the apparatus;

A novel circuit arrangement is provided which insures against phase displacement while at the same time producing such changes in the plate current as can be readily transmitted to the recording station without being subject to extraneous fields and the like which might cause variations in the characteristics of the trace.

The apparatus is capable of use in multiple with such spacing between seismometers that the effects of "ground roll" can be substantially eliminated.

Other and further objects and lesser features of the invention will be more apparent to those skilled in the art upon a consideration of the accompanying drawings and following specification wherein are disclosed several exemplary embodiments of the invention with the understanding that such changes and combinations in and of the features thereof may be made as fall within the scope of the appended claims without departing from the spirit of the invention. This application is a continuation of my co-pending application, Serial No. 324,013, filed March 14, 1940, now abandoned.

In the conduct of geophysical investigations for the determination of subsurface strata disposition, depth, and formation in the search for oil, minerals and the like, it has heretofore been customary to fire a charge of high explosive at some distance below the ground surface and to record from one or more seismometers traces representative of the seismic waves reflected from the strata interfaces and back to the surface. Comparisons of the waves received by the various seismometers at different distances from the source of the earth shock permits a determination, by means forming no part of the present invention, of the desired characteristics of the reflecting surfaces.

The seismometers used have taken a great number of widely differing forms operating on several principles, and that most favored at the present time is of the so-called magnetic type where voltage changes are generated by movement of a permanent magnet relative to a coil. There are a number of reasons, however, for favoring the capacity type as exemplified by the present invention, particularly in certain locations. It is not necessary to go into all of the reasons for the superiority of this type, but one or two important reasons may be pointed out. With the construction in accordance with the present invention, the signal to be used at the recording station is transmitted from the seismometer in the form of a high frequency, pulsating direct current, the changes in R. M. S. values of which actuate the recording mechanism. Such a current is less subject to influence by extraneous sources, such as emanations from power lines, static discharges, earth currents, changes in the earth's magnetic field, and the like. The condenser type seismometer of proper characteristics records magnitude of displacements rather than velocities or accelerations and hence produces higher fidelity results with less opportunity for error. Furthermore, it might be said that this type of construction is more readily capable of use and adjustment for sensitiveness, frequency response, damping, rejection of unwanted waves, and for other factors, while capable of being constructed with great ruggedness. The instrument of the present invention is primarily intended to respond to the vertical components of the seismic waves.

Referring now to the drawings, and first to Figure 4, for an understanding of the operation of the device of the present invention, there is shown in that figure at 10 and 11 a pair of closely spaced relatively movable condenser plates, the mechanical mounting of which will be later described. These plates are incorporated in the oscillating circuit of a three element thermionic tube 12, the filament or cathode 13 of which is energized by current from A battery 13' through conductors 14 and 15. The plate 16 of the tube is directly supplied with plate current by means of the conductor 17 which is connected to the positive side of B battery 17'. The oscillating circuit includes the intermediate tapped inductance coil 18 having the portion 19 which may be referred to as the grid winding and which is connected through the biasing battery 20 to the grid 21 of the tube. The coil also has the section 22 or plate winding connected to the plate by means of conductor 23 in which is interposed the blocking condenser 24 serving to keep the direct plate current out of this oscillating circuit. The intermediate tap of the coil is connected to the cathode by means of the wire 25. The grid coil has its outer end also connected, through resistance 26, to plate 11 of the variable condenser by means of the wire 27 while the outer end of the plate coil is connected to the opposite plate 10 of this condenser by means of wire 28 which is also connected at 29 to the B— lead.

When appropriate potentials are applied to the conductors 14, 15, 17, and 29, the circuit will oscillate at a radio frequency which is dependent upon the characteristics of the various elements of the circuit. The inductances of the two parts of the coil 19, 22 are appropriately selected as well as the value of the resistance 26, condenser 24, and other portions to provide a convenient resonance frequency for any desired fixed spacing of the plates 10 and 11. This spacing can be fixed in repose, as will be later described, and adjusted to give the desired frequency of oscillation, so that thereafter, with all of the other elements remaining constant, any changes in the spacing of the plates 10 and 11 will cause corresponding changes in the oscillation frequencies. The usable output from the detector travels as a pulsating direct current over the B conductors to the recording station where it is convenient to position the B batteries as well as the recording apparatus, which for the sake of the present discussion will be considered to include a string type galvanometer G. When the condenser plates are in repose the current feeding the plate is a fixed high-frequency pulsating direct current from the B battery and reservoir condenser 24 to the plate. This pulsating direct current has a frequency outside of the range of vibration of the galvanometer string to which it is preferably coupled by means of a suitable transformer T and hence has no effect in moving this string. However, as later described, substantially all of the radio frequency alternating and pulsating direct currents are confined within the casing of the seismometer.

With the plates at rest, and the circuit oscillating, there is present in the grid coil a high frequency alternating current of fixed amplitude. The changes in frequency of oscillation brought about by relative movements of the plates 10 and 11 are caused to change the quantity of current flowing to the plate of the tube as follows. The grid bias is preferably set for operation in a non-linear portion of the $E_g$—$I_p$ curve of the vacuum tube for instance near cut-off by appropriate adjustment of the bias battery 20 so that subsequently applied changes in grid potential of equal value but opposite sign will change the plate current by unequal amounts. Changes in condenser plate spacing change the capacity of the condenser and hence the frequency of the oscillating circuit, according to the formula $$f = \frac{1}{2\pi\sqrt{LC}}$$

where $f$ is the frequency in cycles per second, L is the inductance in henries, and C is the capacity in farads. Therefore, when the plates move closer together and the capacity of the condenser increases, it reduces the frequency of oscillation of the circuit. With this reduction in frequency, the mutual inductance between the two portions of the coil 19, 22 will be lessened, therefore decreasing the oscillating voltage applied to the grid by the coil 19. The smaller grid swing will produce a correspondingly smaller amount of rectified plate current. The rectified high frequency portion of the plate current is impeded and smoothed by the use of chokes such as the radio frequency chokes 30 shown in conductors 17 and 29 so that the average variation of amplitude, represented by changes in B current at seismic wave frequencies, may be converted to alternating current by the transformer T which couples the seismometer output (through an amplifier, if necessary) to the galvanometer string. It may be considered that the usable output of the seismometer is a current curve averaging the high frequencies.

Figure 1:
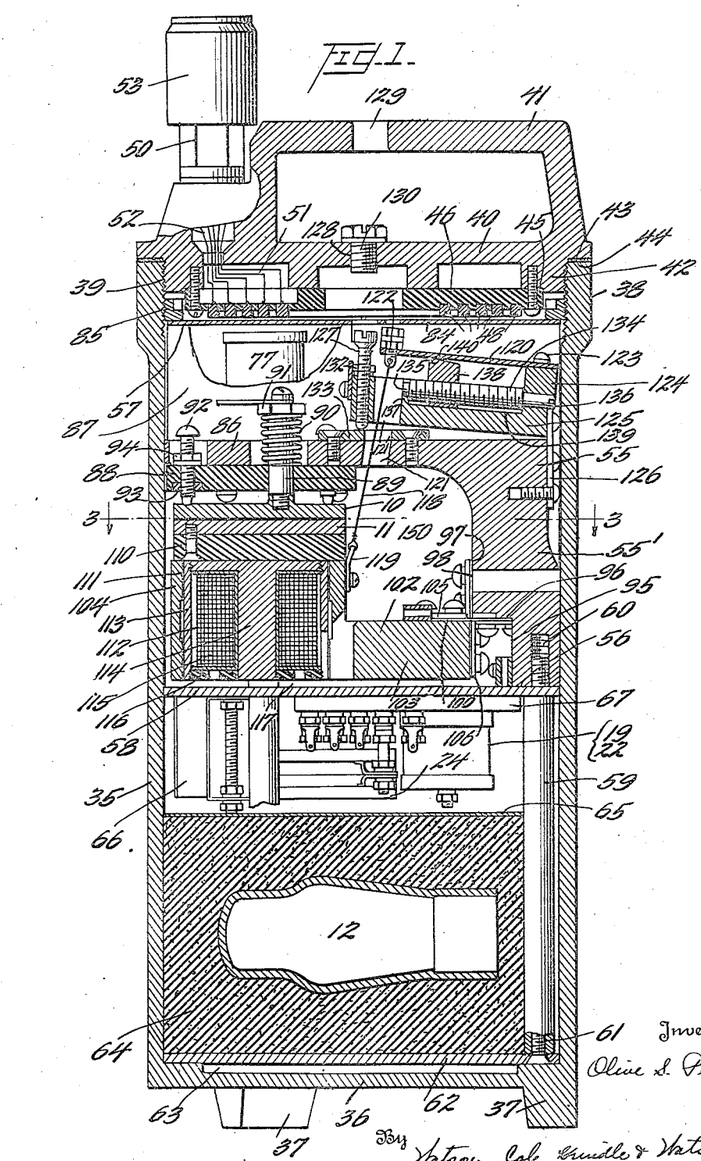
Figure 1 is a central vertical section through a seismometer constructed in accordance with one form of the present invention, the section being taken on a plane at right angles to the axis of movement of the steady mass
Figures 2, 3, 4:
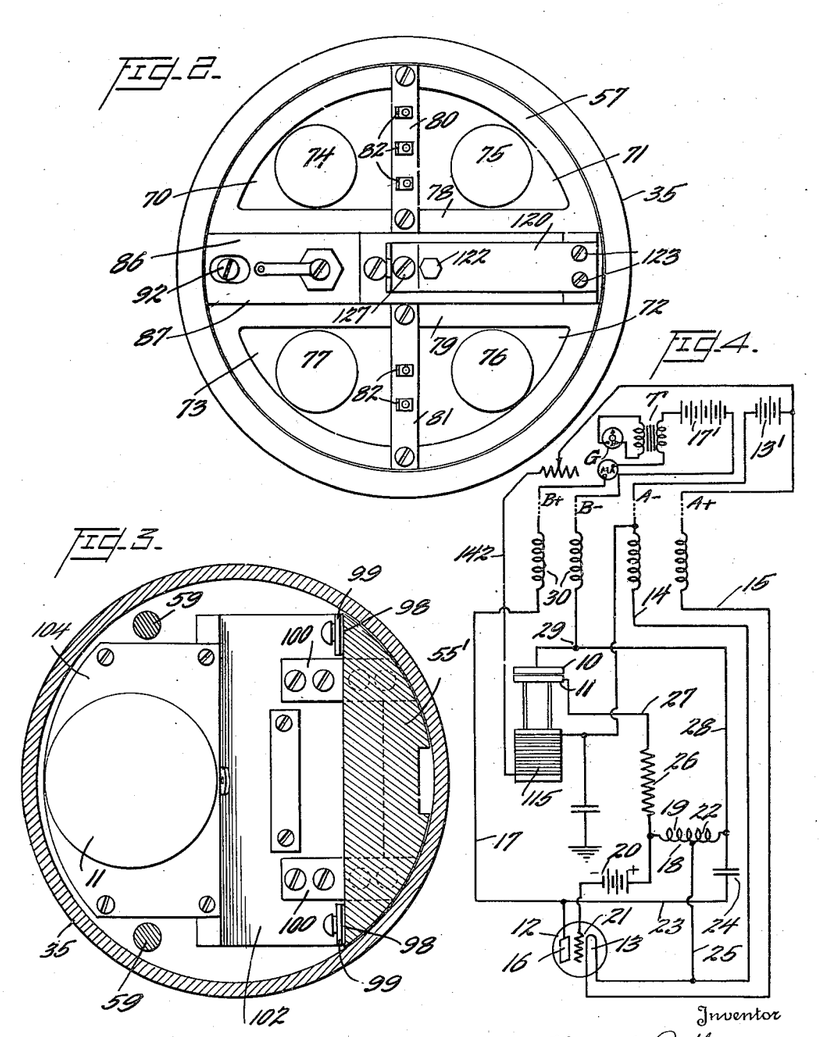
Figure 2 is a plan view of the apparatus with the cover removed.
Figure 3 is a transverse section on line 3—3 of Figure 1, the section plane passing between the two condenser plates.
Figure 4 is a schematic wiring diagram of the circuits of the apparatus contained within the housing.

One form of apparatus for assembling in a compact unit the components of Figure 2 and the necessary mechanism for mounting and adjusting the condenser plates 10 and 11 is shown in Figures 1 to 3 inclusive. The outer casing or housing 35 is preferably cylindrical in form and is conveniently a casting of aluminum or similar metal having a flat bottom 36 and projecting feet 37. The side walls are relatively thin and uniform in thickness except at the top where they are thickened as at 38 to provide increased strength to accommodate the threads 39 by means of which the cap or cover is secured in position. This cover may be a casting of the same material including the flat portion 40, the handle 41 and the depending ring 42 threaded to cooperate with the threads 39 for bringing together the shoulder flange 43 and the upper end 44 of the casing. A suitable water-tight gasket may be interposed here.

The underside of the lid is channeled for stiffness and lightness and is recessed as at 45 to accommodate the annular insulation plate 46 secured in position by screws as shown. This disk has inset in its lower face five coaxial contact rings 48 for cooperation with stationary spring contacts to be later described. An appropriate fitting 50 of watertight construction is provided at one end of the handle in which conventional contact plug receptacles are arranged for connection to the five conductors leading from the rings 48 through the passages 51 and 52. The receptacles are spaced to receive the prongs of a multiple plug 53 to which a five conductor cable is attached for carrying the battery conductors shown in Figure 4 back to the recording station.

All of the apparatus within the housing is carried by or supported from a backbone 55 in the form of an irregularly shaped and compartmented casting generally circular in outer configuration to closely fit the bore of the casing 35 and having a substantially flat bottom 56 and flat top 57. It is preferably formed of some light metal such as aluminum and is kept as light as possible by a cellular construction, as will be later described. The bottom of the casting 55 is completely closed by a soft iron cover plate and shield 58 which is secured to the backbone by means of one of the three spacing rods 59 which are vertically disposed. This one has a reduced threaded end passing through a hole in the plate 58 and received in a threaded aperture 60 in the casting 55. The others which are attached higher up on the casting 55 are divided at the plate 58 and screwed together to clamp to the plate. The lower ends of these rods are attached by screws 61 to an aluminum base plate 62 adapted to bear against the bottom of the bore of the housing which is counter-bored as shown at 63. The space between the bottom plate and the shield 58 is convenient for the mounting of various of the elements of the electric circuit. For instance, the thermionic tube 12 is shown as horizontally positioned and held in place in an aperture in a mass of sponge rubber 64, whereby it is protected from vibrations and microphonics eliminated.

In this mechanical illustration of the features of the invention the electric wiring has been omitted for the sake of convenience and clearness. The tube is wrapped in lead as shown in Figure 1 to reduce microphonics and has the usual base prongs cut off and wires directly soldered to the remaining portions thereof. A fiber separator 65 holds the sponge rubber in position and provides space above it and beneath the shield plate 58 for a filter condenser 66, for the combined grid and plate coils 19, 22 and for the fixed condenser 24 in the oscillating circuit. The C battery 20 and the resistor 26 may also be accommodated in this space, but are not visible in Figure 1. These various parts may be conveniently clamped to the iron plate 58 or to an insulating plate 67 beneath the same by means of appropriate fastening elements such as studs or screws.

Figure 2 shows in plan the top of the backbone casting which is provided with four compartments 70, 71, 72, and 73, to receive the radio frequency chokes 74, 75, 76, and 77, which are shown in the A and B battery leads in Figure 4. These chokes serve to keep the high or oscillating frequency alternating currents out of the conductor cables so that there will be no intercoupling between seismometers whose cables lead to the same recording station. These radio frequency chokes are well shielded from each other by the heavy metal of the casting and of the closely fitting cover.

The flat annular top 57 of the casting is notched at diametrically opposite positions as are the parallel vertical walls 78 and 79 separating the radio frequency choke compartments. Each pair of notches accommodates an insulation strip, the one at the upper side of Figure 2 being numbered 80 and the one at the lower side 81. One of these strips mounts three spring contacts 82 and the other mounts two of these contacts, each spaced from the center a distance to engage with the proper one of the contact rings 48 so that when the cover is screwed in position the circuits are completed from these spring contacts to their respective rings and the screw cover does not have to be stopped in any special position to insure these connections being completed.

A thin insulation plate 84, shown in Figure 1, is perforated to pass the spring contacts 82 and is placed on top of the casting after it and its attached parts has been positioned in the housing and a locking ring 85 screwed down on top of the same by means of a spanner wrench. This serves to clamp the casting and all of its assembled parts tightly in the protecting housing and prevents any relative movement under the severest vibrations.

A portion 86 of the main casting in the form of a transverse septum provides the floor for the compartments housing the radio frequency chokes and for the channel 87 defined by the walls 78 and 79 and extending at right angles to the contact strips 80 and 81. Closely adjacent the edge of this septum and on its under-face is attached the insulating disk 88 which supports the upper condenser plate 10 which is thereby made rigid with the housing and frame of the seismometer. This plate 10, which is preferably made of some non-corrosive material, such as "Monel metal" is eccentrically attached to a post 89 extending from the rear face thereof, as shown, and passing loosely through an aperture in the insulating disk. A helical spring 90 surrounding the portion of this post above the insulating disk bears with its lower end on the disk and with its other end on a nut 91 screwed on the post. It serves to bias the plate upwardly and to permit its adjustment for relative height and for paralleling it to the movable plate. These adjustments are effected by three screws having round ends bearing on the back of the plate, one of which is shown at 92, passing loosely through the insulating disk and engaged with the nut 93 below the disk and nut 94 above the same. By appropriate adjustment of these several screws, and their eventual locking by means of the nuts, the upper plate 10 can be positioned in height and inclination in respect to the portion 86 of the backbone and made parallel to plate 11 in its repose position.

Proper initial spacing of the condenser plates is best obtained by laying the seismometer on its side with the center line thereof absolutely level and the axis of the hinge of the steady-mass pendulum horizontal. The plates are now adjusted by operation of the adjusting screws 92 so that the distance between them is the correct and desired working distance for use when the seismometer is set on end in its normal position. When the seismometer is placed horizontal the pendulum is permitted to swing free without being pulled by its supporting spring. The proper setting of the plates with the seismometer in this position assures that when the seismometer is set on end the center of gravity of the steady mass will then be in the same horizontal plane as the hinge support. This insures that the seismometer will not pick up horizontal components of earth movements.

For reflection surveys the frequency of the moving system is usually adjusted either to match the reflected wave frequency or to a somewhat higher frequency in order to eliminate as much as possible low frequency "ground roll." For refraction work it is desirable that the frequency of the moving system be much lower than the frequency of the waves to be recorded so as to get good amplitude of movement at the beginning of the initial impulse.

At the right hand side of Figure 1 and similarly positioned in Figure 3 is shown the relatively thin depending portion 55' of the backbone 55 relieved on its inner left corner as at 95 to provide a substantially horizontal overhanging surface 96. The inner face of the recess is provided with a vertical surface 97. Both of these surfaces 96 and 97 extend for almost the full diameter of the casing in a direction at right angles to the plane of Figure 1, as clearly seen in Figure 3, for the purpose of widely spacing and supporting the hinge springs for the steady mass which carries the lower condenser plate 11. There are two sets of these springs, one set 98, the vertical, being more widely spaced apart, and are secured against the vertical face 97, each by a pair of screws as shown clamping overlying metal plates 99 tightly thereon. The other set of hinge springs 100 are between but spread almost as widely as the vertical set. They are horizontal as shown and are secured beneath and against the flat face 96 by fastening elements entering the backbone.

The steady mass 102 is a heavy casting preferably of brass or other non-magnetic material. It includes the horizontal arm portion 103 adjacent the two sets of hinge springs just described and having a vertical dimension considerably less than the vertical dimension of the weight portion 104. Its top surface is flat so that the horizontal springs 100 can be secured thereto by suitable fastenings passing through them and the cover plates 105 while the right hand edge has a vertical surface for attachment of the vertical springs 98 by similar fastening means and overlying cover plates 106. This type of spring hinge arrangement is entirely free from any looseness whatsoever in any direction, and within the small range of movement can be made to be substantially frictionless and have a minimum of resisting and restoring torque. The two pairs of springs spaced widely apart at opposite sides of the rigid arm insure against any movement of the steady mass in a lateral direction and confine all movement to that about an axis passing through the intersection of the planes of the two sets of springs. The hinge axis is arranged in horizontal alignment with the center of mass of the steady mass, final adjustment being made by the method discussed above.

The major or weight portion of the steady mass more remote from the hinges is, as previously stated, much greater in vertical height than the arm. In fact it substantially fills the space between the upper condenser plate 10 and the iron plate 58, leaving only room for the very limited vertical movement of the housing in respect to the steady mass. It is the intention to concentrate as much weight as possible within the limited space and as remotely as possible from the hinge, which contributes to the inertia of the steady mass. Care is exercised to maintain the natural period of the steady mass, as sprung, well outside of the range of seismic waves. If the fundamental frequency of the steady mass, as sprung, is so low that it approaches zero the device very nearly records pure displacement.

The top surface of the steady mass has secured thereto a plate 110 of insulation, which has rigidly attached to its upper surface the lower condenser plate 11. Beneath the insulation plate 110, the casting of the steady mass is bored out as at 111 for its full vertical height to accommodate an electromagnet assembly 112, including the soft iron sleeve 113 closely fitting the bore and having threaded into it the headed core 114, as shown. Between the core and sleeve is the magnet wire winding 115, the lower end of which is closed over by an insulating washer 116. The core and tube define a shell type electromagnet whose central and annular poles are spaced from the iron plate 58 by the small air gap 117, as clearly seen in Figure 1. This air gap may be initially adjusted by a vertical movement of the whole magnet assembly within the steady mass in any desired manner. It is finally locked in position to give the desired air gap for a purpose to be later described.

The weight of the whole steady mass is supported by a cable or wire 118, attached by means of a clip 119 as nearly as possible to the center of percussion of the steady mass. By means of this wire 118 the weight of the steady mass is applied to the outer end of a cantilever spring 120 arranged in the transverse groove 87 in the top of the casting, as previously described. The wire passes through a suitable aperture 121 in the wall 86 of the casting. This cantilever spring is so mounted as to be subject to a plurality of adjustments for fixing the repose position, rate of oscillation, size of condenser air gap, damping, and the like, of the steady mass.

The construction of the spring mounting is clearly shown in Figures 1 and 2. The spring is a straight flat metal plate whose free end supports the adjustable screw terminal 122 to which the wire 118 is attached. The opposite end of the spring is secured by a pair of screws 123 to the upstanding lug 124 on a cradle 125 which is hinged, just below the attachment of the spring 120, to the backbone 55 of the whole assembly by means of a stiff spring 126 secured to both the backbone and the rear end of the cradle by means of suitable screws. This cradle carries at its outermost end and beyond the free end of the spring an elevating screw 127 whose head is exactly at the center of the housing so that it is beneath an opening 128 in the cover plate 40 and a corresponding hole 129 in the handle. This permits the use of a screw driver for adjusting the position of the cradle, which in turn changes the position of the steady mass and hence the repose spacing of the condenser plates. The opening 128 is closed by a suitable plug and gasket 130 to maintain the housing watertight. The elevating screw 127 is engaged in a threaded opening in the outer end of the cradle and by means of suitable friction mechanism 132 is prevented from changing its adjustment. Its lower rounded end bears upon a hardened plate 133 secured to the upper face of the partition plate 86 of the casting. A hole 121' in the cradle floor permits passage of the wire 118.

The cradle carries a second adjusting screw 134 substantially at right angles to the elevating screw and parallel to the spring 120. This screw has its ends reduced as at 135 and 136 to provide trunnions for the same bearing in holes in the lug 137 near the free end of the cradle and in the lug 124 at the hinge end. Threadedly mounted on the screw for movement along the same as the screw is rotated is the adjustable fulcrum block 138. The lower face of this block bears closely against the flat surface 139 of the cradle which is parallel to the axis of the adjusting screw and sufficient friction is available here to insure against looseness. The upper end of the block is inclined to provide the sharp fulcrum edge 140 upon which the spring 120 bears. Adjustment of the block 138 by rotation of the screw 134 determines the active length of the cantilever spring and hence the period of the steady mass and its rate of movement in respect to the housing and thus fixes the range of response of the seismograph in accordance with the known rate of vibration of the seismic waves with which it is to operate. In most regions, it is found that these waves have a frequency of from 20 to 70 cycles per second.

The size of the gap between the condenser plates 10 and 11, when in repose, which may be adjusted by the elevating screw 127, determines, at least partially, the damping of the steady mass, because of viscosity of air between plates 10 and 11, which damping, however, is a condition controlled by several other factors and more particularly by the electromagnet previously described. The damping which it affords is, however, not the primary purpose of the magnet.

The winding of this magnet, as shown in Figure 4 is connected between the A— battery source 14 and a conductor 142 which returns to the recording station, passes through a suitable rheostat, and is connected to the A+ terminal. Inserted in the circuit may be an appropriately graduated ammeter to roughly adjust the strength of the magnet, although this is not required since the primary purpose of the magnet is to fix the spacing of the condenser plates 10 and 11 just prior to the time of taking a reading. The rheostat permits a remote adjustment here, since the magnet in attracting the iron plate beneath it acts in opposition to the cantilever spring and provides a means for not only increasing the pull on the spring but for remotely adjusting the gap between the condenser plates. The size of this gap can be very accurately read at the control station by the use of a milliammeter MA in the plate circuit of the tube. It will be recalled that this plate current bears a definite and known relation to the frequency of oscillation of the tube and, once having calibrated the system, the gap between the condenser plates can be accurately determined, for instance, in fractions of a millimeter by a reading of the milliammeter at the recording station, if such factors as A and B voltages are held reasonably constant or are compensated for. Remote adjustment of the condenser plate gap is important to permit compensation for temperature changes and other transient variables.

Where it is desired to have the seismometer operate about a certain fundamental frequency of the output current while yet permitting changes in plate spacing to adjust the damping in accordance with external conditions, the frequency can be adjusted by varying the current in the tube filament.

Figure 5:
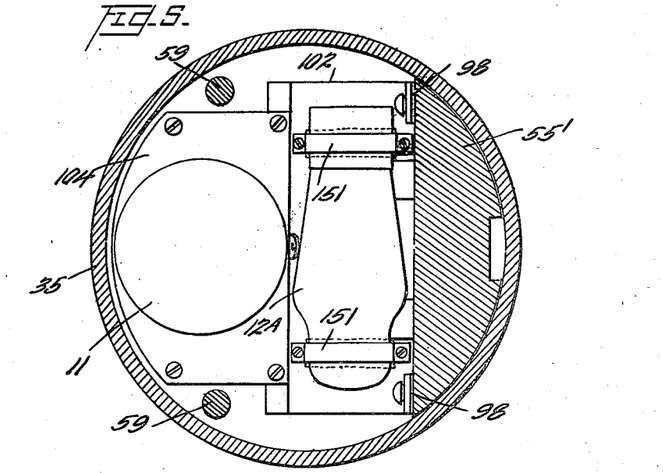
Figure 5 is a fragmentary view similar to Figure 3, but showing the thermionic tube mounted on the steady mass.

In Figure 5 is shown a further embodiment of the seismometer in which the thermionic tube 12A has been moved from the position shown in Figure 1 in the sponge rubber mass to a mounting on the steady mass in the space designated in Figure 1 by the reference character 150 and lying just above the arm portion of the steady mass. As shown, the tube is secured to the steady mass arm by a pair of metal bands 151 passing around the same and compressing sponge rubber cushion strips between the bands and the surface of the tube.

By placing the tube as just described, several advantages are gained. In the first place, the tube is so mounted that it is not subjected to the seismic shocks since the steady mass is intended to remain stationary while the remainder of the seismometer moves about it. In the second place, several inches in vertical height can be cut off of the detector, reducing both the volume and weight of the same. Where these devices are used in difficult terrain and far from base, they must be transported by trucks, by pack animals or by human carriers, so that any saving in size or weight is extremely valuable. Thirdly, the weight of the steady mass is increased without any attendant total weight increase in the seismometer.

Condenser type seismometers constructed according to the present invention lend themselves particularly well to ganging or multiple use for the purpose of reducing or entirely eliminating the pick-up of ground waves. As is well-known in seismology, the waves of largest amplitude which reach the seismometers as the result of a explosion are in most cases those travelling in the surface or weathered layer of the earth, or very near the same, and since they do travel so close to the surface they follow nearly the shortest path, and are often the first to reach the various detectors. In any event such waves have amplitudes much greater than those of the wanted reflected waves. If the apparatus is made sensitive enough to record the desired waves with proper degre of amplitude on the chart, then the unwanted waves are recorded with such overintensity as to be detrimental to the equipment and to extend off of the recorded chart. The time of arrival of the first of these waves may be of importance but the remainder of them are of no consequence and merely serve to confuse the recording.

In accordance with the present invention the above difficulties may be partially or entirely eliminated by ganging a number of condenser seismometers in place of the usual one at each station and spacing them apart in the line of approach of the ground waves at approximately one-half wave length intervals so that their outputs substantially cancel each other. The reflected waves, however, having more nearly a vertical component reach the units of this gang of seismometers almost simultaneously and thereby augment each other, thus increasing the size of the wanted record and decreasing the size of the unwanted record, making them more nearly of the same order. Since the first seismometer in line is affected without corresponding cancellations from the others when surface waves first arrive the time of arrival will be nicely shown on the chart.

Figure 6:
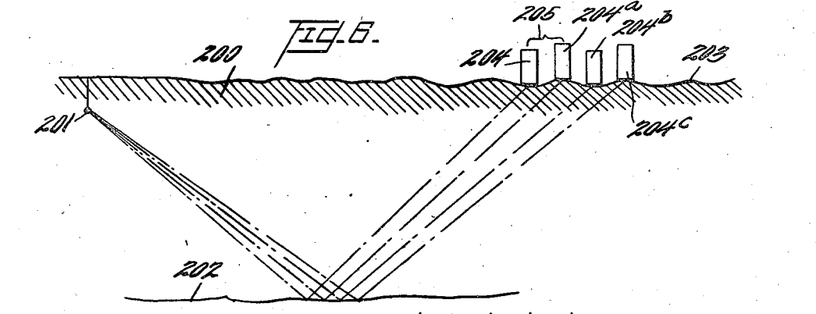
Figure 6 is a schematic showing of the use of a plurality of condenser seismometers in multiple grouping to reduce or eliminate the major portion of the direct waves.
Figure 7:
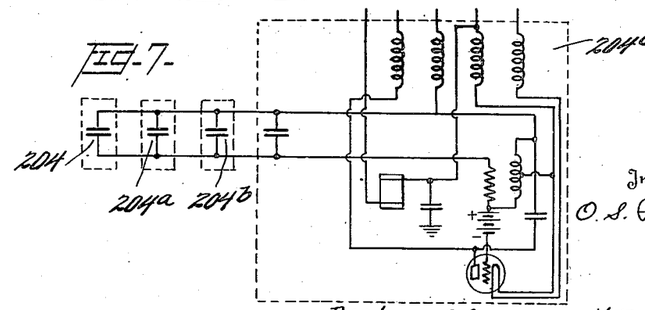
Figure 7 is a circuit diagram of the same.

Reference to Figure 6 will make this arrangement clear for there is shown at 200 the weathered layer of the ground with the shot point 201 arranged just below this layer for better transmission of the artificially propagated seismic waves and at 202 is shown an assumed reflecting surface whose depth is not in proportion to other spacings on the chart because of lack of space. The surface of the ground is shown to be formed into exaggerated waves 203 representing the so-called "ground roll," "ground wave" or the like, and four condenser type seismometers 204, 204a, 204b, and 204c are shown positioned on the surface of the ground in a line with the shot point and with the spacing 205 between centers of any adjacent pair preferably equivalent to substantially one-half wave length of the "ground wave." The length of this wave, in most any type of weathered layer, is a matter of record or can be ascertained before-hand very simply. Great exactitude in this matter is not essential. It will be seen from the position of the waves that any two adjacent seismometers are either in phase opposition or are at a substantially neutral point and at the same amplitude. Two might be sufficient but four are preferred, arranged in circuit as shown in Figure 7.

For the purpose of this arrangement seismometer 204c is identical with that previously described in this application and the circuit is the same as that of Figure 4. The remaining seismometers, however, can be much simpler and may include only the mechanical parts as disclosed in the several previous figures together with the variable condenser plates. Thus in Figure 7 seismometers 204, 204a, and 204b are represented merely by condenser plates although of course they include the adequate mechanical mounting for the same so that these plates will respond exactly as the ones in the seismometer described in detail above. The condensers of each of the four seismometers are set to substantially the same plate spacing and are connected in parallel as shown. Then, by appropriate adjustment of the proper elements the tube circuit is made to oscillate at the desired frequency but under the control of all four of the sets of condenser plates. It wil be seen that if two of these are widely opened and two others are brought closely together the total change in capacity of the set will be practically zero so that the total effect of "ground roll" will hardly be noticeable. When, however, reflected waves are received, the condenser plates of the several seismometers move substantially in unison and thereby exert an augmented control on the frequency of oscillation of the circuit, resulting in greater changes in the output.

For purposes of convenience it might be desirable to have the auxiliary seismometers 204, 204a, and 204b also equipped with the magnetic coil for determining their repose setting and hence their damping as well as control of the oscillating circuit.

With the arrangement just described no additional conductors need be returned to the recording station above the number required when a single seismometer is used. It will be appreciated that a plurality of seismometers arranged in a row and connected to control a single oscillating circuit give an output averaging the "ground waves." If they are placed sufficiently close together, they become the equivalent of a continuous flexible condenser and it is within the import of this invention to include such a continuous condenser which should have a length not much greater than one-half wave length. It might be constructed in the nature of a coaxial cable with suitably resilient spacers or it could take other forms, and in each case be connected to an oscillating circuit of the type described to give an average result. It would of course give a summation for reflected waves.

While the invention has been illustrated as applied to a seismometer of the capacitive type, certain features of the invention pertaining especially thereto, it will be apparent from the foregoing description that certain other features, for instance the provision for indicating and remotely controlling the spacing of the relatively movable elements of the seismometer, are applicable to various other types of instrument, such as the electromagnetic type, the reluctance type, the piezo-electric type, and various types less commonly employed in which accurate determination of the repose position of the movable element is desirable.

Having thus described the invention, what is claimed as new and desired to be secured by Letters Patent is:

1. In a portable seismometer of the condenser type, in combination, a housing, a condenser plate rigidly supported for movement with the housing, a second condenser plate spaced closely to the first, a steady-mass mounting said second plate and being hinged to the housing for movement relative thereto in a direction at right angles to the planes of said plates, spring means biasing said second plate toward the first one, and adjustable magnetic means acting between the housing and steady-mass for adjusting the plate spacing against said bias.

2. In a portable seismometer of the condenser type, in combination, a housing, a condenser plate rigidly supported for movement with the housing, a second condenser plate spaced closely to the first, a steady-mass mounting said second plate and being hinged to the housing for movement relative thereto in a direction at right angles to the planes of said plates, spring biasing means supporting the steady-mass and acting to move the same about its hinge in one direction only, and a magnet carried by said steady-mass and arranged to exert a force to always oppose the effect of said means.

3. In a portable seismometer of the condenser type, in combination, a housing, a condenser plate rigidly supported for movement with the housing, a second condenser plate spaced closely to the first, a steady-mass mounting said second plate and being hinged to the housing for movement relative thereto in a direction at right angles to the planes of said plates, means acting to move said steady-mass about its hinge, magnetic means for opposing the effect of said means, and means to adjust the strength of said magnetic means to vary the initial spacing of said plates.

4. In a portable seismometer of the condenser type for use with other elements to form an oscillating circuit and including relatively movable condenser plates the spacing of which determines the frequency of oscillation of said circuit, means mounting said plates for relative position change in response to seismic waves and including biasing means tending to fix the normal plate spacing, and means adjusted remotely from the seismometer and adapted to oppose said biasing means to thereby adjust the initial setting of the plates and thus the oscillation frequency.

5. In a portable seismometer of the condenser type, in combination, relatively movable condenser plates, means mounting said plates for relative position change in response to seismic waves and including biasing means tending to fix the normal plate spacing, and electromagnetic means having an adjustable pull in opposition to said biasing means whereby adjustment of the repose spacing of the plates may be effected remotely from the seismometer.

6. In a portable condenser type seismometer for operating a remote recorder, in combination, a closed housing adapted for movement in response to seismic waves, a steady-mass hinged to said housing, a pair of closely spaced condenser plates secured respectively to the said housing and steady-mass for relative movement, a vacuum tube in said housing, impedance elements incorporating said tube and plates into a circuit oscillating at a frequency dependent on the spacing of said plates, a source of plate current for said tube, said circuit being such that changes in said oscillation frequency cause corresponding changes in the plate current, an electro-magnet mounted in said steady-mass, an armature fixed to said housing below said magnet, a source of current for said magnet, and means to adjust said current to vary the plate spacing to determine the repose value of said plate current.

7. In a portable seismometer of the condenser type, in combination, a housing, a condenser plate rigidly supported for movement with the housing, a second condenser plate spaced closely to the first, a steady-mass mounting said second plate and being hinged to the housing for movement relative thereto in a direction at right angles to the planes of said plates, spring means carried by the housing for supporting said steady-mass, said spring means comprising a cantilever spring, means suspending said steady-mass from the free end of said spring, and an adjustable fulcrum for said spring.

8. In a portable seismometer of the condenser type, in combination, a housing, a condenser plate rigidly supported for movement with the housing, a second condenser plate spaced closely to the first, a steady-mass mounting said second plate and being hinged to the housing for movement relative thereto in a direction at right angles to the planes of said plates, spring means for supporting said steady-mass from the housing, said spring means comprising a cantilever spring, means suspending said steady-mass from the free end of said spring, a cradle for said spring supported on said housing and having the opposite end of said spring secured thereto, a knife edge fulcrum for said spring slidable in said cradle, and means to adjust said fulcrum longitudinally of the cradle.

9. In a portable seismometer of the condenser type, in combination, a housing, a condenser plate rigidly supported for movement with the housing, a second condenser plate spaced closely to the first, a steady-mass mounting said second plate and being hinged to the housing for movement relative thereto in a direction at right angles to the planes of said plates, spring means for supporting said steady-mass from the housing, said spring means comprising a cantilever spring, means suspending said steady-mass from the free end of said spring, a cradle for said spring supported on said housing and having the opposite end of said spring secured thereto, a knife edge fulcrum for said spring slidable in said cradle, means pivoting the spring-attached end of said cradle to said housing, and means to move said cradle about its pivot to change the repose spacing of said condenser plates.

10. A portable condenser type seismometer including, in combination, a closed bottom tubular metal casing, a metal closure cap for the same, a backbone casting immovably mounted in said casing and having a recess therein, a steady-mass and attached lever in said recess, means hinging said lever to said casting, means suspending and providing a restoring force for said steady-mass, a pair of closely positioned condenser plates, one supported by said casting and the other by said steady-mass, a thermionic tube and oscillating circuit elements in said casing and connected to said condenser plates, said tubes and elements being so positioned as to be shielded from each other, from the condenser plates and external fields by the casing, casting and steady-mass.

11. A portable condenser type seismometer including, in combination, a tubular metal casing, a closure cap for the same, a metal backbone casting immovably mounted in said casing and having a recess therein, a steady-mass and attached lever in said recess, means hinging said lever to said casting, means suspending and providing a restoring force for said steady-mass, a pair of closely positioned condenser plates, one supported by said casting and the other by said steady-mass, a thermionic tube and oscillating circuit elements in said casing and connected to said condenser plates, said casting having compartments therein, certain of said circuit elements being positioned in said compartments for electrostatic shielding.

12. A portable condenser type seismometer including, in combination, a tubular metal casing, a closure cap for the same, a backbone casting immovably mounted in said casing and having a recess therein, a steady-mass and attached lever in said recess, means hinging said lever to said casting, means suspending and providing a restoring force for said steady-mass, and a pair of closely positioned condenser plates, one supported by said casting and the other by said steady-mass.

13. In a portable seismometer of the condenser type, in combination, a housing, a condenser plate rigidly supported for movement with the housing, a second condenser plate adapted to have a close repose spacing adjacent the first, a steady-mass mounting said second plate and being hinged to the housing at a distance laterally of the plates for small range movement in a direction at right angles to the planes of the plates, the axis of the hinge being in the same horizontal plane as the center of gravity of the steady-mass movable-plate assembly, whereby the seismometer is unresponsive to horizontal components of seismic waves.

14. A portable condenser type seismometer responsive to vertical displacements comprising, in combination, a supporting member adapted to be moved by seisms, a condenser plate carried by said member, a steady-mass, a second condenser plate on said mass, means movably suspending said steady-mass from the supporting member with said condenser plates in close proximity, said suspending means being resilient and providing a restoring force for said steady-mass after displacement, an electric circuit so associated with said condenser plates as to be influenced by their spacing, means in said circuit to record the instantaneous spacing of said plates, means in said circuit independent of said last named means to indicate the repose spacing of said plates, and means remote from the seismometer to adjust the repose spacing of said plates.

15. In a portable seismometer of the type employing elements which are readily displaceable on application thereto of seismic wave energy, in combination, a housing, an element rigidly supported in the housing, a second element supported in the housing for movement relative to said first element, and means mounting said second element to permit such relative movement, said means including a steady-mass carrying said second element, said steady-mass being hinged to the housing on an axis laterally spaced from said elements, the hinged axis being disposed substantially in the horizontal plane containing the center of gravity of the steady-mass, whereby the seismometer is unresponsive to horizontal components of seismic waves.

16. A portable seismometer responsive to vertical displacements comprising, in combination, a supporting member adapted to be moved by seisms, a first element carried by said member, a steady-mass, a second element on said mass, means movably suspending said steady-mass from the supporting member with said elements in close proximity, an electric circuit so associated with said elements as to be influenced by their spacing, means in said circuit to record the instantaneous spacing of said elements, means in said circuit independent of said last named means to indicate the repose spacing of said elements, and means remote from the seismometer to adjust the repose spacing of said elements.

17. A portable seismometer responsive to displacements, comprising a casing, a steady-mass supported from said casing, and means for generating a voltage which is a function of the instantaneous displacement between said casing and said steady-mass, separate means for recording said voltage, separate means for indicating at a remote place the average spacing between said casing and said steady-mass, and means to adjust the average spacing between said casing and said steady-mass from a remote place.

18. In a portable seismometer responsive to vertical displacements, in combination, a housing, a steady-mass hinged to said housing, means for generating a voltage which is a function of the instantaneous displacements between said housing and said steady-mass, the axis of said hinge being in the same horizontal plane as the center of gravity of said steady-mass, whereby the seismometer is unresponsive to horizontal movements.

19. In a portable seismometer responsive to vertical displacements, in combination, a housing, a steady-mass hinged to asid housing, means for generating a voltage which is a function of the displacements between said housing and said steady-mass, the axis of said hinge being in the same horizontal plane as the center of gravity of said steady-mass, whereby the seismometer is unresponsive to horizontal movements.

OLIVE SCOTT PETTY.